(12) United States Patent
Sugawara

(10) Patent No.: US 8,207,713 B2
(45) Date of Patent: Jun. 26, 2012

(54) SWITCHING POWER SUPPLY CIRCUIT

(75) Inventor: Takato Sugawara, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 400 days.

(21) Appl. No.: 12/654,619

(22) Filed: Dec. 24, 2009

(65) Prior Publication Data

US 2010/0165683 A1 Jul. 1, 2010

(30) Foreign Application Priority Data

Dec. 25, 2008 (JP) ................................. 2008-329298

(51) Int. Cl.
G05F 1/613 (2006.01)

(52) U.S. Cl. ..................... 323/222; 323/284; 363/56.05; 363/89

(58) Field of Classification Search .................. 323/205, 323/222, 265, 267, 271–273, 282–288; 363/36, 363/49, 55, 56.05, 65, 86, 89, 81
See application file for complete search history.

(56) References Cited

U.S. PATENT DOCUMENTS

| | | | | |
|---|---|---|---|---|
| 4,937,728 A | * | 6/1990 | Leonardi | 363/97 |
| 5,479,090 A | * | 12/1995 | Schultz | 323/284 |
| 5,777,462 A | * | 7/1998 | Yue | 323/285 |
| 6,657,877 B2 | | 12/2003 | Kashima et al. | |
| 6,728,121 B2 | * | 4/2004 | Ben-Yaakov et al. | 363/89 |
| 7,095,215 B2 | * | 8/2006 | Liu et al. | 323/222 |
| 7,391,630 B2 | * | 6/2008 | Acatrinei | 363/89 |

FOREIGN PATENT DOCUMENTS

JP 2007-295800 A 11/2007

OTHER PUBLICATIONS

"Renesas Critical Conduction Mode PFC IC R2A20113", Renesas Technology Corp., Aug. 2008.

* cited by examiner

Primary Examiner — Rajnikant Patel
(74) Attorney, Agent, or Firm — Rabin & Berdo, P.C.

(57) ABSTRACT

A switching power supply circuit that obtains a predetermined DC voltage output from an input AC power supply includes a full-wave rectifier and a boost circuit connected to the rectifier. The boost circuit generates a DC output having a predetermined voltage value from the rectifier output. A power factor improving circuit controls an ON-period of an output transistor of the boost circuit, based on feedback of the DC voltage output, and a dynamic over-voltage-protection circuit controls the ON-period of the output transistor as it performs a switching operation. The switching power supply circuit facilitates an over-voltage-protection function that prevents inductor buzzing with an integrated circuit having a small number of pins.

9 Claims, 7 Drawing Sheets

FIG. 4
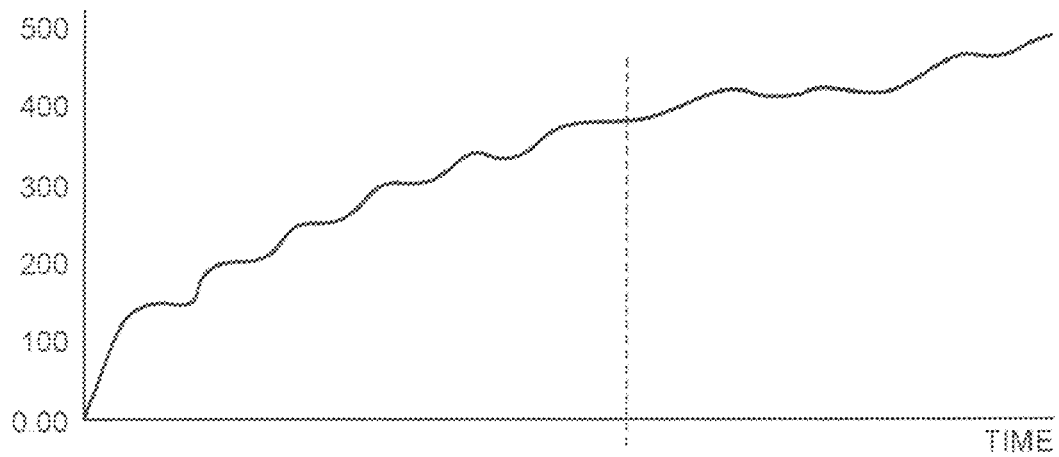
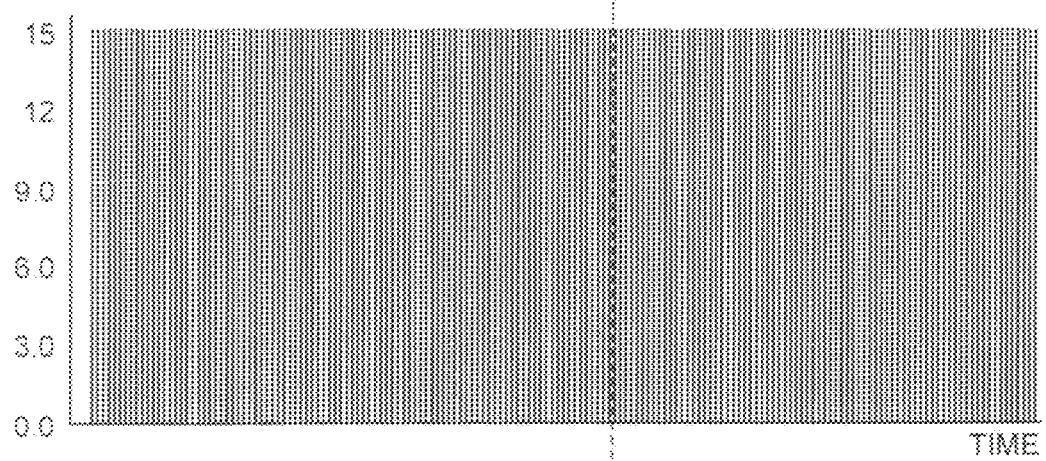
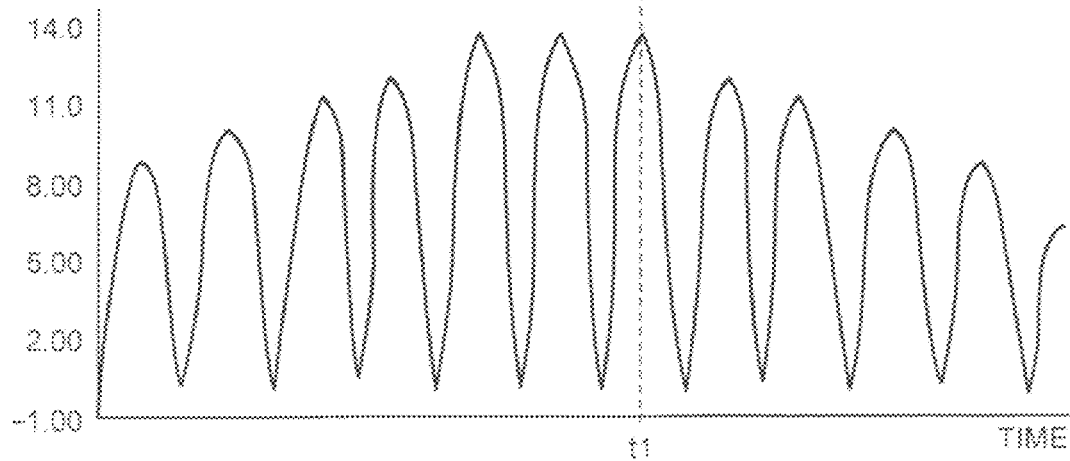

FIG. 7
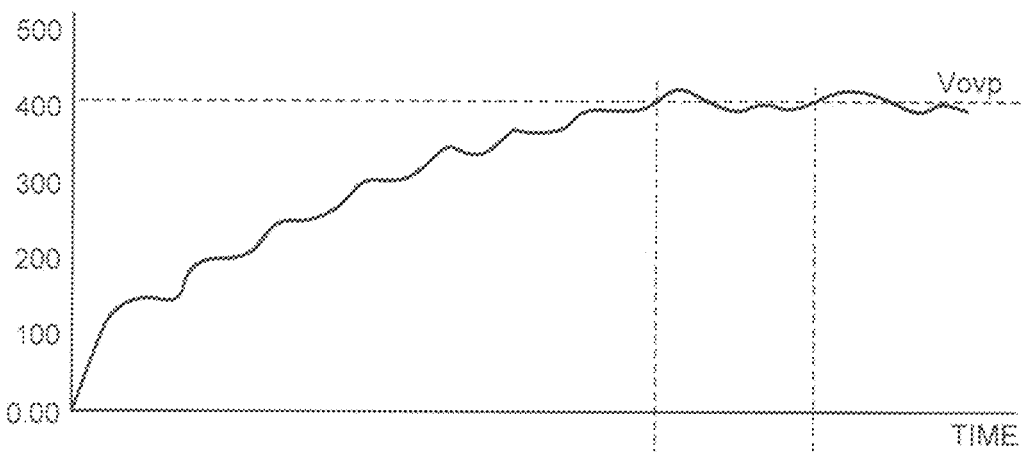
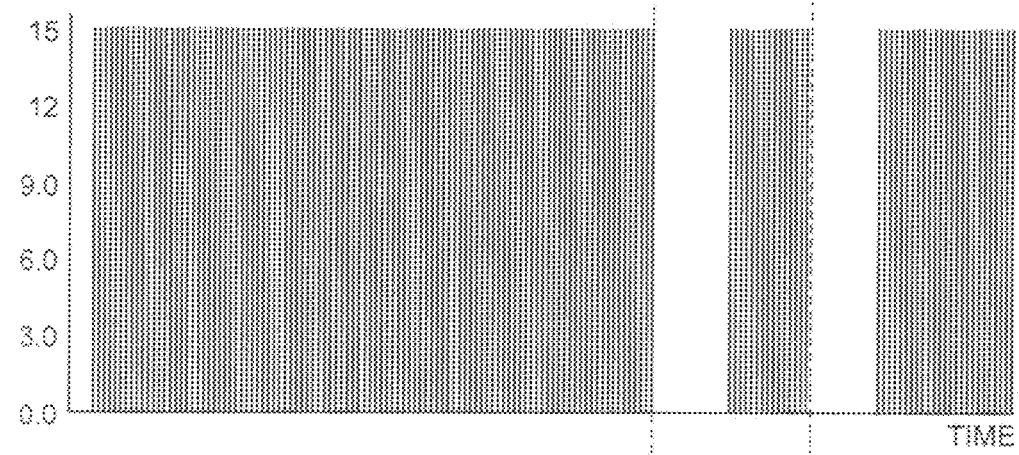
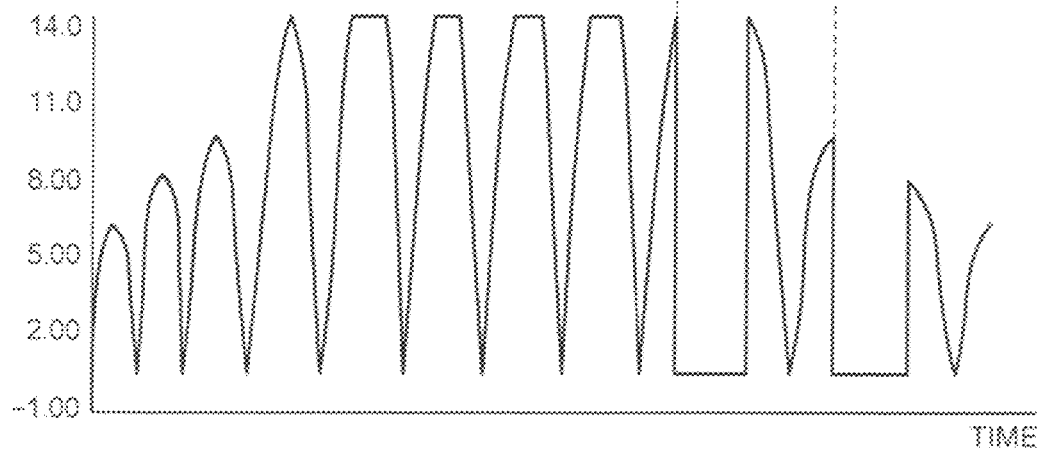

SWITCHING POWER SUPPLY CIRCUIT

FIELD OF THE INVENTION

Embodiments of the present invention relate to a switching power supply circuit that obtains a predetermined DC voltage output from an AC input power supply. Specifically, the embodiments of the invention relate to a switching power supply circuit that boosts a commercial AC power supply with an inductance element and facilitates improving the power factor.

BACKGROUND

Many types of electronic equipment, to which a commercial AC power supply (AC 100 V) is fed, use a switching power supply circuit to obtain a DC power supply for driving the internal electronic circuits of the electronic equipment. Therefore, it is necessary for the switching power supply circuit to provide a rectifier circuit for converting the commercial AC power supply to a DC power supply. If power factor improvement is not conducted, a high frequency current component and a high frequency voltage component will be caused in the rectifier circuit, and the power factor will be impaired, since a current flows only at the peak of the input voltage to a smoothing capacitor connected to the rectifier circuit.

The power factor is obtained by dividing the input effective power Pi(W) (that is, the product of the same phase components of an input voltage and an input current in an AC circuit), by the apparent power (that is, the product of the effective value of the input voltage and the effective value of the input current). In other words, the effective power is obtained by multiplying the apparent power by a factor (e.g., power factor) determined by a load. When a resistance load is connected to an AC 100 V source, the voltage waveform and the current waveform are in-phase, resulting in a power factor of 1. Due to a load factor other than the resistance, the current phase may sometimes be delayed from the voltage phase. Since the effective power lacks a component corresponding to the delay, it can be necessary to prevent the power factor from being lowered, using a power factor improving circuit, and to suppress the power consumption.

FIG. 6 is a block circuit diagram showing a switching power supply circuit that employs a conventional power factor improving circuit.

The power factor improving circuit is a circuit that sets an AC input voltage and an AC input current to be in phase to improve the power factor, prevents harmful electromagnetic interference (hereinafter referred to as "EMI"), and prevents a high-frequency current and a high-frequency voltage that may break down the equipment.

In the switching power supply circuit shown in FIG. 6, full-wave rectifier 1 performs full-wave rectification of an AC input voltage. The output terminal of full-wave rectifier 1 is connected to the first end of capacitor 2 and a boost circuit. Capacitor 2 removes the high frequency current and the high-frequency voltage caused by the switching operation of output transistor 4, described later. The boost circuit includes boost inductor 3 on the primary side of transformer T, having a first end connected to the output terminal of full-wave rectifier 1, a metal-oxide-semiconductor field-effect transistor (a MOSFET that will be referred to hereinafter as an "output transistor") 4 connected between the second end of inductor 3 and a reference potential, diode 5, and capacitor 6 connected to the second end of inductor 3 via diode 5. A synchronous rectifying transistor may readily be used in substitution for diode 5. The boost circuit boosts and rectifies the rectified voltage fed from full-wave rectifier 1 and feeds a DC output voltage, e.g. about 400 V, to a load (not shown) connected between output terminal 7 and the ground.

Power factor controller (hereinafter referred to as "PFC") circuit 10 may be implemented by an integrated circuit that integrates various functions into a unit. PFC circuit 10 includes FB terminal FB for receiving a feedback signal, IS terminal IS for detecting the current flowing through output transistor 4, OUT terminal OUT for providing an output, ZCD terminal ZCD for receiving a zero-cross signal, RT terminal RT for connecting a resistor for determining the oscillation waveform of oscillator 13, and COMP terminal COMP for connecting a phase compensation element. The integrated circuit may include error amplifier 11, formed by a trans-conductance amplifier, PWM comparator 12, oscillator 13, OR-circuits 14a and 14b, RS flip-flop 15, ZCD comparator 16, timer 17, OVP comparator 18 for over-voltage protection, and comparator 19 for detecting an overcurrent.

RT terminal RT of PFC circuit 10 is connected to timing resistor R1, the first end of which is grounded. ZCD terminal ZCD is connected to the first end of inductor 8 on the secondary side of transformer T via resistor R2. The second end of inductor 8 on the secondary side is grounded. OUT terminal OUT is connected to the gate of output transistor 4. The source terminal of output transistor 4 is connected to the second end of current detecting resistor R3, the first end of which is grounded. The connection point of the source terminal of output transistor 4 and the second end of current detecting resistor R3 is connected to IS terminal IS. Output terminal 7 is grounded via dividing resistors R4 and R5 connected in series to each other. The connection point of dividing resistors R4 and R5 is connected to FB terminal FB. COMP terminal COMP is grounded via capacitor C1. A series circuit of resistor R6 and capacitor C2 are connected in parallel to capacitor C1. PFC circuit 10 also includes a VCC terminal for receiving the power supply voltage and a GND terminal for grounding, although these terminals are not illustrated in FIG. 6.

PFC circuit 10 sets the inductor current in the boost circuit and the output voltage to the load to be in phase.

Error amplifier 11 in PFC circuit 10 receives reference voltage Vref via the non-inverting input terminal of error amplifier 11. The inverting input terminal of error amplifier 11 is connected to FB terminal FB. The output from error amplifier 11 is connected to COMP terminal COMP and the inverting input terminal of PWM comparator 12. The output from PWM comparator 12 is connected to the reset terminal of RS flip-flop 15 via OR-circuit 14a. Oscillator 13 is connected to timing resistor R1 via RT terminal RT. Oscillator 13 generates an oscillating output having a saw-tooth-waveform and a gradient corresponding to the resistance value of timing resistor R1. The oscillating output is fed to the non-inverting input terminal of PWM comparator 12.

ZCD comparator 16 receives reference voltage Vzcd via the non-inverting input terminal of ZCD comparator 16. The inverting input terminal of ZCD comparator 16 is connected to ZCD terminal ZCD. The output from ZCD comparator 16 is connected, together with the output from timer 17, to the set terminal of RS flip-flop 15 via OR-circuit 14b. The Q output Q from RS flip-flop 15 is fed to the gate terminal of transistor 4 via OUT terminal OUT. OVP comparator 18 receives reference voltage Vovp on the inverting input terminal of OVP comparator 18. The non-inverting input terminal of OVP comparator 18 is connected to FB terminal FB. The output from OVP comparator 18 is connected to the reset terminal of RS flip-flop 15 via OR-circuit 14a. Comparator 19 receives reference voltage Vovc on the inverting input terminal of comparator 19. The non-inverting input terminal of comparator 19 is connected to IS terminal IS. The output from comparator 19 is connected to the reset terminal of RS flip-flop 15 via OR-circuit 14a.

The power factor control performed in the switching power supply circuit shown in FIG. 6 is called a "fixed-ON-period control method." The fixed-ON-period control method is applied to electronic equipment, and consumes a small amount of power, e.g. around 250 W or lower.

The control methods used in power factor improving circuits include a peak current mode control (hereinafter referred to a "PCMC"), an average current mode control (hereinafter referred to an "ACMC"), and the like.

Next, fixed-ON-period control by PFC circuit 10 as shown in FIG. 6 will be described.

ZCD comparator 16 detects the voltage value at which the current flowing through inductor 3 on the primary side of transformer T in the boost circuit becomes zero. ZCD comparator 16 detects the zero inductor current, sets the output of ZCD comparator 16 at a high level (H-level), and feeds the set signal at the H-level to RS flip-flop 15. As the set signal at the H-level is fed to RS flip-flop 15, RS flip-flop 15 sets its Q output Q at the H-level. Q output Q from RS flip-flop 15 is outputted from OUT terminal OUT, bringing output transistor 4 into the ON-state. The output from ZCD comparator 16 is also fed to oscillator 13. Oscillator 13, triggered by the output from ZCD comparator 16, starts generating a saw-tooth oscillation output (saw-tooth-wave signal) at the time at which output transistor 4 becomes ON. As the saw-tooth-wave signal reaches a predetermined value, oscillator 13 stops generating the oscillation output, and rests the oscillation output at an initial value to wait for a next trigger input.

The divided voltage obtained by dividing the DC voltage fed to output terminal 7 with resistors R4 and R5 is fed back to FB terminal FB. Error amplifier 11 generates an error signal obtained by amplifying the difference between the feedback voltage and reference voltage Vref. PWM comparator 12 compares the error signal with the saw-tooth-wave signal from oscillator 13. As PWM comparator 12 detects that a value of the saw-tooth-wave signal has reached a value of the error signal, PWM comparator 12 feeds a reset signal to RS flip-flop 15. As the reset signal is fed to RS flip-flop 15, Q output Q from RS flip-flop 15 is set at a low-level (hereinafter referred to as an "L-level"). As Q output Q set at the L-level is outputted from OUT terminal OUT of PFC circuit 10, output transistor 4 is brought into the OFF-state.

If the weight of the load connected to output terminal 7 of the switching power supply circuit is constant, the error signal will be constant. The ON-period of output transistor 4 is a period of time from the time at which the saw-tooth-wave signal starts from the reference value to the time at which the value of the saw-tooth-wave signal reaches the value of the error signal. Therefore, the ON-period of output transistor 4 is controlled to be constant. However, since the input to the switching power supply circuit is an AC voltage, the voltage across inductor 3 changes depending on the phase angle of the AC voltage. Therefore, the gradient of the inductor current flowing through inductor 3 on the primary side of transformer T changes depending on the input voltage. The peak values of the inductor current that are the current values at the times at which output transistor 4 is brought into the OFF-state cause an AC waveform.

By the operation described above, zero-current switching is performed by the zero-cross switching control in PFC circuit 10 using the fixed-ON-period control method. By the zero-current switching, a low-loss and low-noise operation is realized. However, since the inductor current is reset in association with every ON and OFF of output transistor 4, the peak of the inductor current becomes high. (The peak current is twice as high as the effective current.) Therefore, the inductance becomes too large in the switching power. supply circuit, which can feed a high wattage of DC power. To avoid the latter problem, a continuous control method is usually employed.

In the power factor improving circuit described above, which includes the described boost circuit, PFC circuit 10 incorporates an over-voltage-protection function for preventing the voltage boosted by the boost circuit from rising limitlessly when an anomaly is caused. In more detail, OVP comparator 18 connected to FB terminal FB monitors the rise of the feedback voltage. When the feedback voltage rises to reference voltage Vovp, which is higher than reference voltage Vref by a certain percentage, a reset signal is fed to RS flip-flop 15 for stopping the switching operation of output transistor 4.

FIG. 7 shows wave charts describing a voltage waveform and a current waveform at the start of the power supply operation and at the transient response in the conventional power factor improving circuit.

Since no soft-start circuit is employed in operations as described above, an over voltage is caused at the start of the power supply operation and at the transient response. The wave chart (a) in FIG. 7 describes the output voltage fed to the load connected to output terminal 7. The wave chart (b) in FIG. 7 describes the gate signal that controls the ON and OFF of output transistor 4. The wave chart (c) in FIG. 7 describes the envelope connecting the peak values of the inductor current. When reference voltage Vovp for over-voltage protection is set, for example, at 400 V, output transistor 4 is turned OFF as shown in the wave chart (b) in FIG. 7, as the voltage fed to the load exceeds the set value of 400 V even if only a little, as described in the wave chart (a) in FIG. 7. As output transistor 4 is turned OFF and the switching operation is stopped, the current flowing through inductor 3 on the primary side of transformer T becomes zero. (If diode 5 is not present, the current flowing through inductor 3 on the primary side of transformer T will keep decreasing to the negative side.) FIG. 7 also describes the steady-state operations of a conventional power factor improving circuit, e.g., when an overshoot is caused on the output voltage in the steady state operation of the conventional power factor improving circuit, similarly resulting in an abrupt stopping of the switching operation.

In the state in which a current is flowing through inductor 3 on the primary side of transformer T, a magnetic field is generated around inductor 3. Due to the magnetic field, magneto striction (mechanical deformation) is caused in the core of transformer T. When the inductor current becomes zero due to the zero-current switching, the magnetic field that causes magneto striction in the core vanishes, as output transistor 4 is made to stop switching in the usual switching operation. However, the deformation due to the magneto striction has not been completely removed yet. As a next switching period starts as described in the wave chart (b) in FIG. 7 before the deformation is removed from the core and the core is restored to its original shape, an inductor current flows through inductor 3 on the primary side of transformer T, causing magneto striction again in the core of transformer T.

While the operation described above is repeated, inductors 3 and 8 in transformer T are forced to vibrate mechanically at the switching frequency. When the core is vibrating at the switching frequency and the switching frequency is not in the audible range, buzzing of transformer T is not caused (although an ultrasonic wave may be generated). On the other hand, if the switching operation is stopped suddenly, a vibration that releases the magneto striction energy at the mechanical and natural vibration frequency of the core is caused. If the natural vibration frequency is in the audible range, a single shot of sound will be caused at the time at which the switching operation is stopped. Therefore, when a sudden change is caused in the input current, buzzing is caused in transformer T (core buzzing is caused).

At the time at which the starting operation of the power factor improving circuit is completed, a single shot of buzzing is caused as described above, without exception. For preventing a single shot of buzzing, in conventional circuits a soft-start circuit is added to prevent overshooting at the start of the operation of the power factor improving circuit. See Japanese Unexamined Patent Application Publication No. 2007-295800, in particular paragraphs [0042] through [0049] and FIG. 7.

The buzzing caused by the stopping of a switching operation further causes a troublesome noise from household equipment (such as a TV set) used in a living room or a similar quiet environment.

The method disclosed in Japanese Unexamined Patent Application Publication No. 2007-295800, that adds a soft-start circuit to prevent overshooting at the start of the power supply operation, exhibits some effectiveness toward preventing the buzzing caused at the start of the power supply operation. However, when PFC circuit 10 is implemented by an integrated circuit, pins used solely for the soft start are needed. It is possible for a semiconductor device (IC) having many pins (16 pins or 20 pins) to provide pins solely for the soft start. However, it is difficult for a semiconductor device (IC) having few pins (8 pins for example) to provide pins solely for the soft start. The soft-start circuit is provided so as not to generate any over voltage at the start of the power supply operation. Since the soft-start circuit stops the switching operation as soon as an over voltage is detected in the steady state of operation after the starting operation is over, it is impossible for the soft-start circuit, in the steady state, to prevent the buzzing caused by an over voltage from occurring.

In view of the foregoing, it would be desirable to obviate the problems described above. It would be also desirable to provide a switching power supply circuit that prevents the buzzing caused by the stopping of a switching operation with an integrated circuit that has a small number of pins.

SUMMARY OF THE INVENTION

According to embodiments of the invention, there is provided a switching power supply circuit configured to produce/obtain a DC voltage output from an input AC power supply. The switching power supply circuit can include a full-wave rectifier configured to perform full-wave rectification of the input AC power supply, and a boost circuit. The boost circuit can be configured to generate the DC voltage output with a predetermined voltage value from the output terminal voltage of the full-wave rectifier. The boost circuit can include a boost inductance element having a first end connected to the output terminal of the full-wave rectifier, a switching device connected between a second end of the inductance element and a reference potential, a rectifying device (e.g., a diode), and a capacitor connected to the second end of the inductance element via the rectifying device.

The switching power supply circuit can further include a power factor controller configured to control an ON-period of the switching device based on an error signal obtained by amplifying a difference between the feedback voltage of the DC voltage output and a reference voltage. To control the ON-period, the power factor controller can be configured to compare the feedback voltage with a first protection voltage as the reference voltage, and shorten the ON-period of the switching device by an amount of time corresponding to the difference between the feedback voltage and the first protection voltage.

The switching power supply circuit according to embodiments of the invention can, for example, facilitate realizing an over-voltage-protection function that prevents inductor buzzing in an over-voltage-protection operation by an integrated circuit having a small number of pins.

BRIEF DESCRIPTION OF THE DRAWINGS

FIG. 4 shows wave charts describing a voltage waveform and a current waveform at the start of a power supply operation and at the transient response in the switching power supply circuit according to the embodiments;

FIG. 7 is a wave chart describing a voltage waveform and a current waveform at the start of a power supply operation and at the transient response in the conventional power factor improving circuit.

DETAILED DESCRIPTION OF THE INVENTION

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
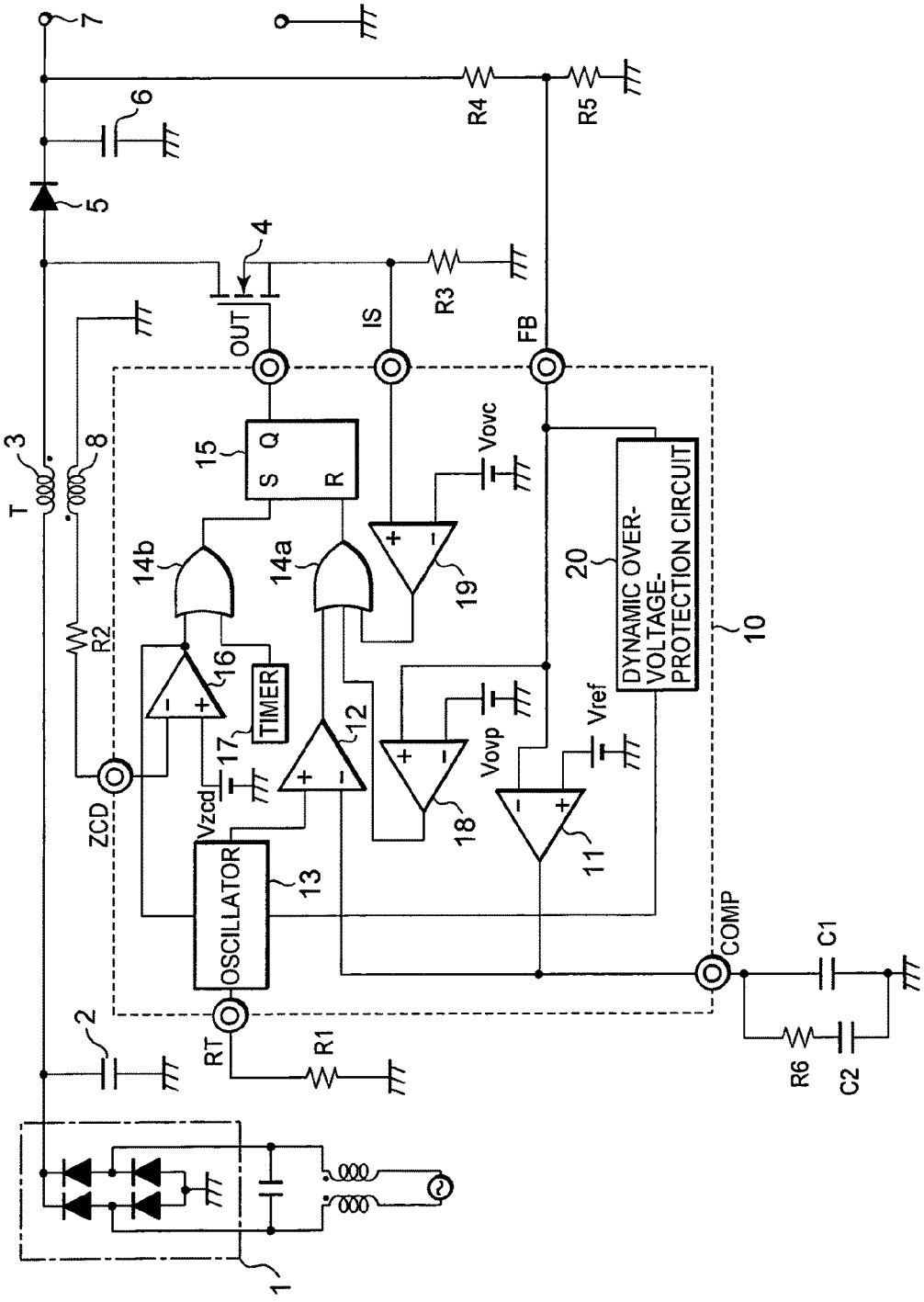
FIG. 1 is a block circuit diagram showing a switching power supply circuit to employ a fixed-ON-period control method according to embodiments of the invention.
Figure 2:
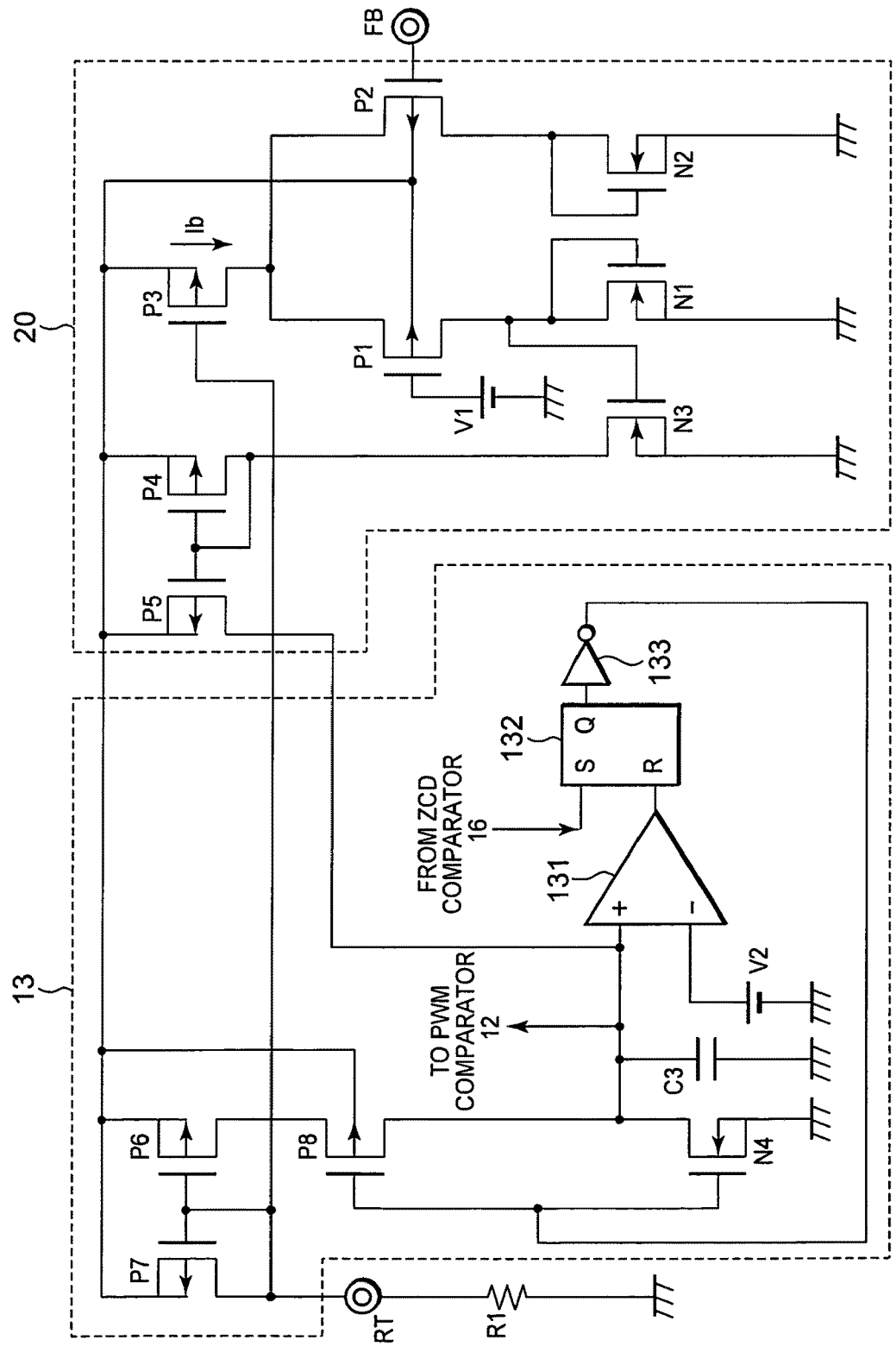
FIG. 2 is a block circuit diagram showing detailed configurations of a dynamic over-voltage-protection circuit and an oscillator in the switching power supply circuit shown in FIG. 1.

FIG. 1 is a block circuit diagram showing a switching power supply circuit employing a fixed-ON-period control method according to an exemplary embodiment. FIG. 2 is a block circuit diagram showing detailed configurations of a dynamic over-voltage-protection circuit and an oscillator in the switching power supply circuit shown in FIG. 1.

Figure 6:
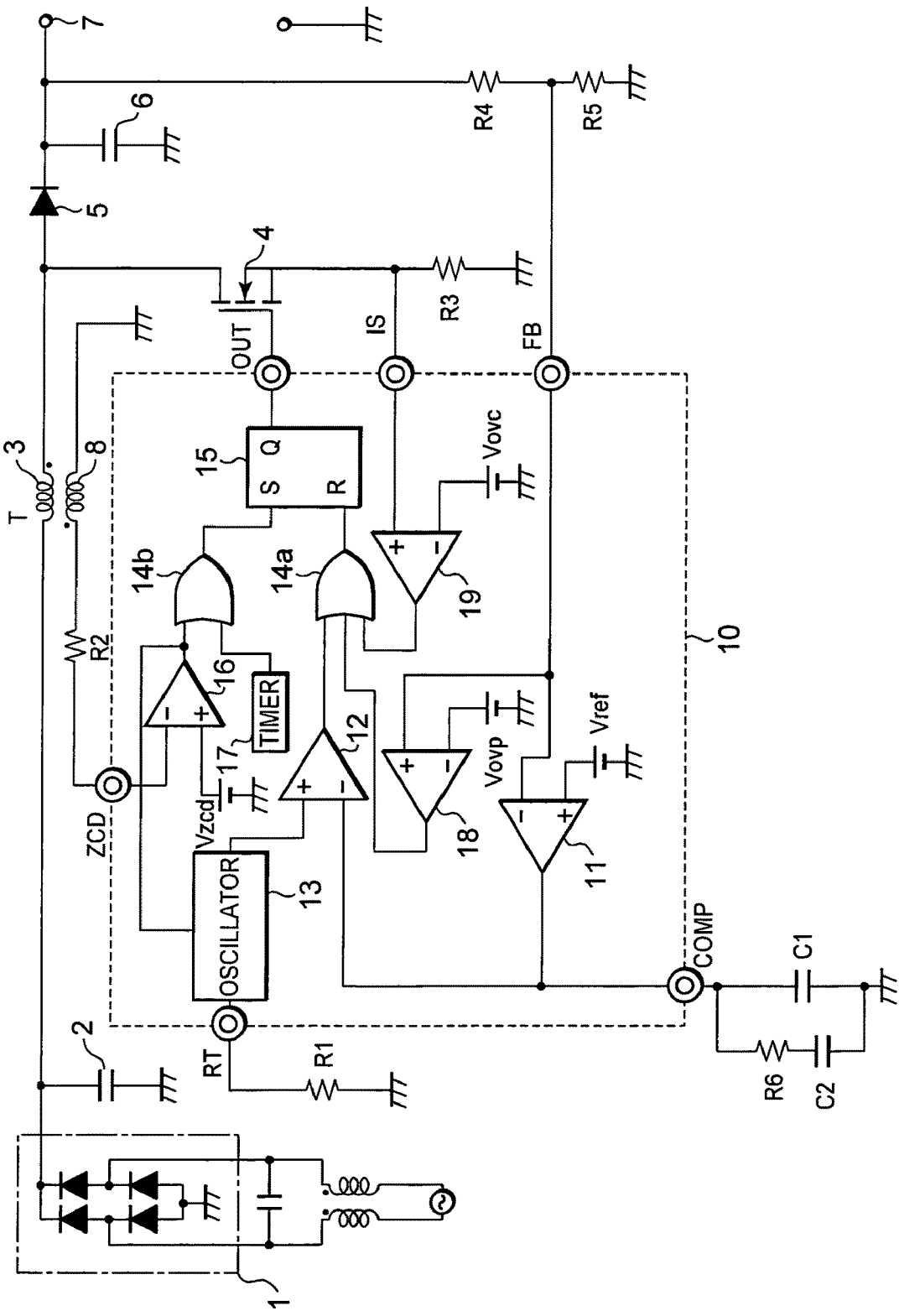
FIG. 6 is a block circuit diagram showing a switching power supply circuit that employs a conventional power factor improving circuit.

The switching power supply circuit shown in FIG. 1 is configured by adding dynamic over-voltage-protection circuit 20 to PFC circuit 10 to the conventional switching power supply circuit (shown in FIG. 6). Dynamic over-voltage-protection circuit 20 monitors the feedback voltage from FB terminal FB and causes oscillator 13 to shorten the ON-period of output transistor 4 by an amount of time corresponding to the difference between a first protection voltage and the feedback voltage. The other configurations are the same as those in FIG. 6. The same reference numerals and symbols as used in FIG. 6 are used to designate the same constituent elements in FIGS. 1 and 2 and their duplicated descriptions are omitted for the sake of simplicity.

Dynamic over-voltage-protection circuit 20 is configured, as shown in FIG. 2, as a current amplifier, to which the feedback voltage from FB terminal FB is fed. MOSFETs P1, P2, P3, N1 and N2 constitute a differential amplifier circuit. MOSFET P3 receives, at the gate thereof, a bias voltage from oscillator 13 (described later), and functions as a constant current circuit that feeds constant current Ib. MOSFETs P1 and P2 constitute a differential input stage. MOSFETs N1 and N2 are connected in a diode connection and function as the load MOSFETs for MOSFETs P1 and P2. The gate of MOSFET P1 is connected to reference voltage V1. The gate of MOSFET P2 is connected to FB terminal FB. MOSFET N3, together with MOSFET Ni constituting a current mirror, feeds a current signal corresponding to the feedback voltage value to a current mirror formed by MOSFETs P4 and P5. MOSFETs P4 and P5 constitute the output stage of dynamic over-voltage-protection circuit 20.

If MOSFETs P1 and P2 are set to be the same in size, the currents flowing through MOSFETs P1 and P2 will be the same (e.g, (½)Ib) when the gate voltages of MOSFETs P1 and P2 are the same. If the gate voltage of MOSFET P2 (that is, the feedback voltage from FB terminal FB) is higher than the gate voltage of MOSFET P1 (that is, first reference voltage V1), the current flowing through MOSFET P1 is larger than the current flowing through MOSFET P2, corresponding to the difference between first reference voltage V1 and the feedback voltage, and exceeding the current value (½)Ib. If the gate voltage of MOSFET P2 (that is, the feedback voltage from FB terminal FB) is lower than the gate voltage of MOSFET P1 (that is, first reference voltage V1), the current flowing through MOSFET P1 is smaller than the current flowing through MOSFET P2, corresponding to the difference between first reference voltage V1 and the feedback voltage, and exceeding the current value (½)Ib to a lesser degree than when the gate voltage of MOSFET P2 is higher than the gate voltage of MOSFET P1.

If the feedback voltage is lower than first reference voltage V1 and if the difference between first reference voltage V1 and the feedback voltage has or exceeds a certain magnitude, the current flowing through MOSFET P1 becomes zero. The current flowing through MOSFET P1 is copied by the current mirror formed by MOSFETs N1 and N3 and fed to a current mirror formed by MOSFETs P4 and P5. By the operation described above, a current having a magnitude corresponding to the difference between first reference voltage V1 and the feedback voltage is fed from MOSFET P5 in the output stage to oscillator 13 as an additional charging current for charging capacitor 3. Since the output stage of dynamic over-voltage-protection circuit 20 is formed only by P-channel MOSFETs P4 and P5, the output stage of dynamic over-voltage-protection circuit 20 works for a current source but not for a current sink.

Oscillator 13 includes P-channel MOSFETs P6 through P8, N-channel MOSFET N4, comparator 131, RS flip-flop 132, and inverter 133. Resistor R1, connected to the drain of MOSFET P7 via RT terminal RT, is a resistor for determining the value of the charging current for charging capacitor C3. In more detail, the current caused by the voltage obtained by subtracting the voltage between the source and drain of MOSFET P7, in a diode connection, from the power supply voltage of dynamic over-voltage-protection circuit 20 and applied to resistor R1, determines the charging current for charging capacitor C3. The current flowing through resistor R1 is copied by MOSFETs P6 and P7, which together constitute a current mirror, and fed to the source of MOSFET P8 from the drain of MOSFET P6.

Since MOSFET P8 is ON when the output from inverter 133 is at the L-level, the current fed from MOSFET P6 charges capacitor C3. Since the charging current is constant, the charging voltage of capacitor C3 rises linearly. The gradient of the charging voltage rising linearly is obtained by dividing the charging current fed from MOSFET P6 by the capacitance value of capacitor C3. The gate voltage of MOSFET P7, which determines the current that flows through MOSFET P6, is fed to the gate of MOSFET P3 as a bias voltage as described above.

Comparator 131 compares reference voltage V2, connected to the inverting input terminal of comparator 131, with the charging voltage of capacitor C3, connected to the non-inverting input terminal of comparator 131. As the value of the charging voltage of capacitor C3 reaches the value of reference voltage V2, comparator 131 resets RS flip-flop 132. As RS flip-flop 132 is reset, the output from inverter 133 is set at the H-level. MOSFET N4, which receives the H-output from inverter 133, is brought into the ON-state. MOSFET N4 in the ON-state discharges capacitor C3 and resets the charging voltage of capacitor C3 to be zero. The zero-reset state of the charging voltage of capacitor C3 continues until RS flip-flop 132 is reset by the H-output from ZCD comparator 16 when ZCD comparator 16 has detected that the inductor current is zero.

As RS flip-flop 132 is reset by ZCD comparator 16, the output from inverter 133 is set at the L-level, MOSFET P8 is set to be ON, MOSFET N4 is set to be OFF, and the charging of capacitor C3 is resumed. The gradient of the rising charging voltage of capacitor C3 is made to be larger by adding an additional charging current fed from dynamic over-voltage-protection circuit 20 to the charging current of capacitor C3.

Figure 3:
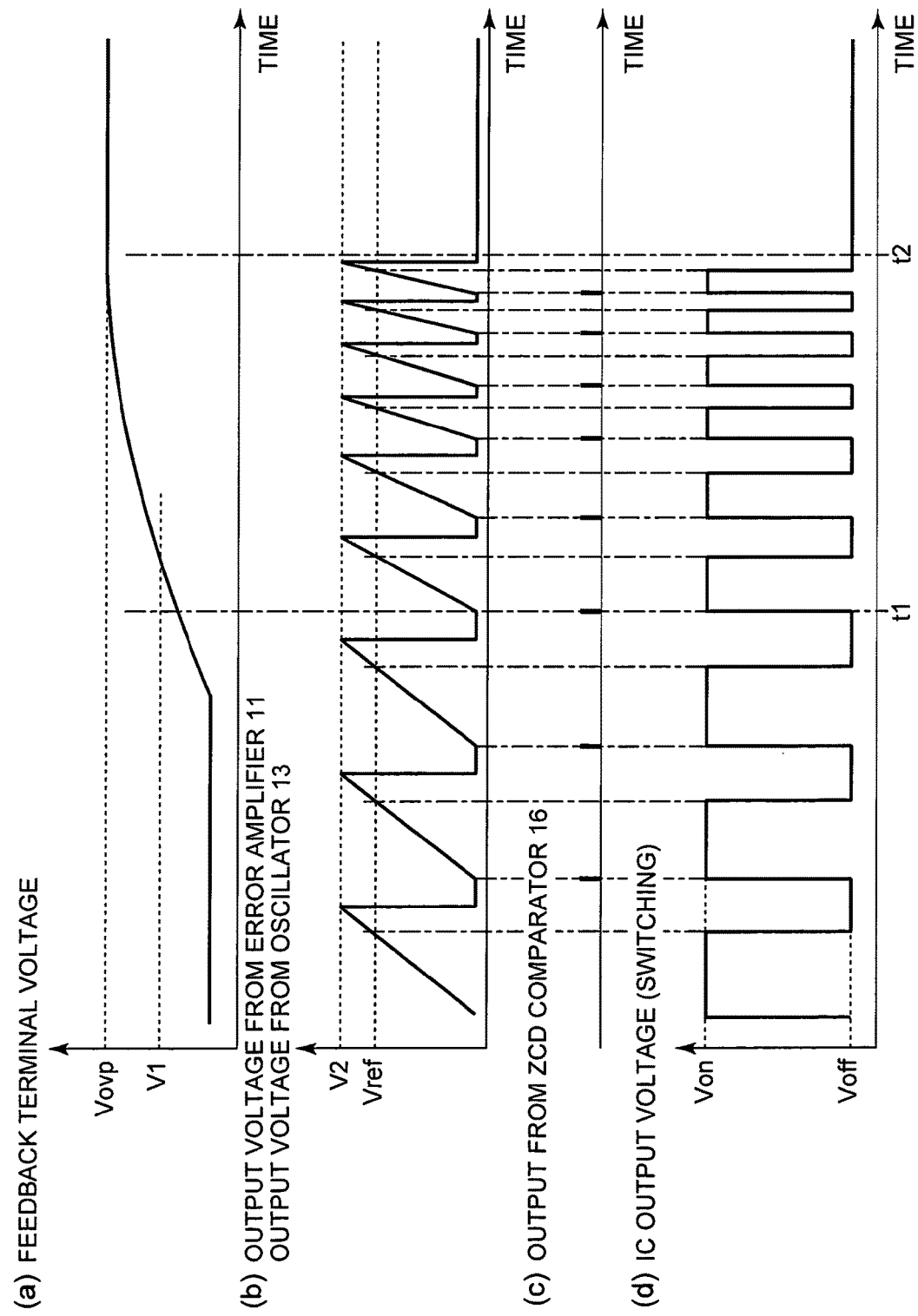
FIG. 3 is a timing chart describing the operation of the switching power supply circuit according to the embodiments.

FIG. 3 is a timing chart describing the operation of the switching power supply circuit according to embodiments of the invention.

In dynamic over-voltage-protection circuit 20, the value of feedback voltage, caused by an over voltage and fed to FB terminal FB, approaches a value of first reference voltage V1, and MOSFET P5 starts working as a source of an additional charging current at a time t1. The additional charging current charges capacitor C3 together with the current from MOSFET P6. Since the current that charges capacitor C3 becomes larger after time t1, the gradient at which the charging voltage of capacitor C3 rises becomes larger in such a way that the value of the charging voltage reaches the value of reference voltage V2 faster and is reset to be zero faster. The charging of capacitor C3 is resumed at the time at which the output from ZCD comparator 16 becomes high (H) again.

First reference voltage V1 works as a dynamic over-voltage-protection voltage. The dynamic over-voltage-protection voltage may be set to a predetermined voltage value between reference voltage Vref set in error amplifier 11 and reference voltage Vovp set in OVP comparator 18. Reference voltage Vovp corresponds to a static over-voltage-protection voltage.

FIG. 4 shows wave charts describing a voltage waveform and a current waveform at the start of the power supply operation and at the transient response in the switching power supply circuit according to embodiments of the invention.

In FIG. 4, it is assumed that an over voltage will be caused at the start of operation of the switching power supply circuit, since no soft-start circuit is employed in the switching power supply circuit. The rise of the power supply voltage is shown in the first half (on the left hand side) of the drawing. The occurrence of an over voltage and the response to the over voltage caused are shown in the second half (on the right hand side) of the drawing. The wave chart (c) in FIG. 4 shows the envelope connecting the peak values of the inductor current.

As dynamic over-voltage-protection circuit 20 starts responding to an over voltage caused at time t1, an additional charging current is fed to capacitor C3 in oscillator 13 from dynamic over-voltage-protection circuit 20. Therefore, the gradient, with which the triangular wave outputted from oscillator 13 increases monotonically, becomes larger (see FIG. 3, part (b)).

Even if the feedback voltage becomes large as the gradient of the triangular wave becomes larger, the output from error amplifier 11 will be unable to change abruptly due to the function of the phase compensation element. Therefore, the output from error amplifier 11 keeps a certain value and the ON-period of output transistor 4 at the switching thereof becomes narrower gradually.

Output transistor 4 is turned ON when the inductor current is zero, and the increment of the inductor current is proportional to the ON-period of output transistor 4. Therefore, the peak value of the inductor current becomes lower gradually as the ON-period of output transistor 4 becomes narrower. Since the effective current of inductor 3 is half the peak value of the inductor current, the current fed to the output decreases gradually and the output voltage rise is suppressed. As the feedback voltage further increases and exceeds reference voltage Vovp set in OVP comparator 18 as the second reference voltage, RS flip-flop 15 is reset and the switching operation is stopped.

As described earlier with reference to FIG. 7, a rapid inductor current change is caused in the conventional circuit by the cessation of switching, when an over voltage is caused. In contrast, the power factor improving circuit according to embodiments the invention facilitates realizing a limiting operation that reduces the inductor current slowly, as the value of the feedback voltage comes close to the value of the first reference voltage V1 set in dynamic over-voltage-protection circuit 20.

In contrast to the conventional and static over-voltage protection function, that suddenly stops switching as the feedback voltage exceeds reference voltage Vovp, the above-described limiting operation according to embodiments of the invention facilitates preventing buzzing caused by a rapid inductor current change. By gradually narrowing the ON-period at the time of switching to limit the peak value of the inductor current gradually, a switching power supply circuit exhibiting a soft over-voltage-protection function that causes no buzzing is realized.

The energy released in association with the release of the magneto striction is determined by the history of the inductor current up to the instance at which the switching device is turned OFF. The difference of the energy added in every switching period and the energy released in every switching period is stored. Therefore, the energy caused by magneto striction will not be reduced to zero, even if the inductor current is suddenly reduced to zero. For minimizing the magneto striction energy at the time when output transistor 4 is turned OFF, it is preferable to decrease the inductor current gradually in every switching period while keeping the switching frequency at a certain value. If the magneto striction energy is released, no sound will be heard, since the frequency of magneto striction energy release is not in the audible range.

By releasing the magneto striction energy gradually in every switching period and by making the energy remaining after the final stop of switching almost zero, no noise is caused. The function that makes dynamic over-voltage-protection circuit 20 reduce the inductor current slowly to prevent buzzing is effective not only in starting operation of the power supply but also against an over voltage caused at any time point.

Since the ON-period at the time of switching becomes shorter as the magnitude of over voltage is larger, the peak inductor current becomes lower. Therefore, it is possible to lower the output voltage faster. When a small output voltage rise is not due to a serious malfunction, such as a short-circuit of the load, it is possible to prevent the output voltage from being lowered excessively.

If, to stop the switching operation, the inductor current is not reduced gradually, but instead reduced in a time of short duration, this will be equivalent to suddenly stopping the switching operation. Since the deformation energy caused by the magneto striction remains at the time at which the switching is stopped, it is impossible to prevent buzzing by simply reducing the inductor current in a time of short duration.

As described above, the switching power supply circuit according to embodiments of the invention realizes a dynamic over-voltage-protection function in addition to the static over-voltage-protection (OVP) that stops generating a switching pulse when an over voltage is detected. The dynamic over-voltage-protection function detects a predetermined voltage lower than the over voltage to control the switching frequency, in such a way that an over voltage is prevented "softly," by shortening the gate-ON-period. The dynamic over-voltage-protection function reduces the inductor current in response to the feedback voltage in the transient caused, for example, by the start of the power supply operation, or by a load variation, and reduces the magneto striction energy to zero. Then, the dynamic over-voltage-protection function stops the switching operation. The dynamic over-voltage-protection according to embodiments of the invention, functioning as described above, facilitates preventing inductor buzzing.

If the dynamic over-voltage-protection according to embodiments of the invention is applied to a switching power supply circuit employed in a household equipment used, for example, in the living room of a home, or a similarly quiet setting, the switching power supply circuit may be incorporated into an integrated circuit that has a small number of pins, since any soft-start circuit is unnecessary.

Error amplifier 11 has been described in connection with a trans-conductance amplifier that includes a phase compensation circuit connected between the output terminal and the ground. Alternatively, error amplifier 11 may readily be implemented as an operational amplifier that includes a phase compensation circuit connected between the input and output thereof. For the sake of safety, the switching power supply circuit according to embodiments of the invention may include a conventional static over-voltage-protection circuit that makes the switching stop at a feedback voltage higher than the feedback voltage for the dynamic over-voltage-protection voltage.

Figure 5:
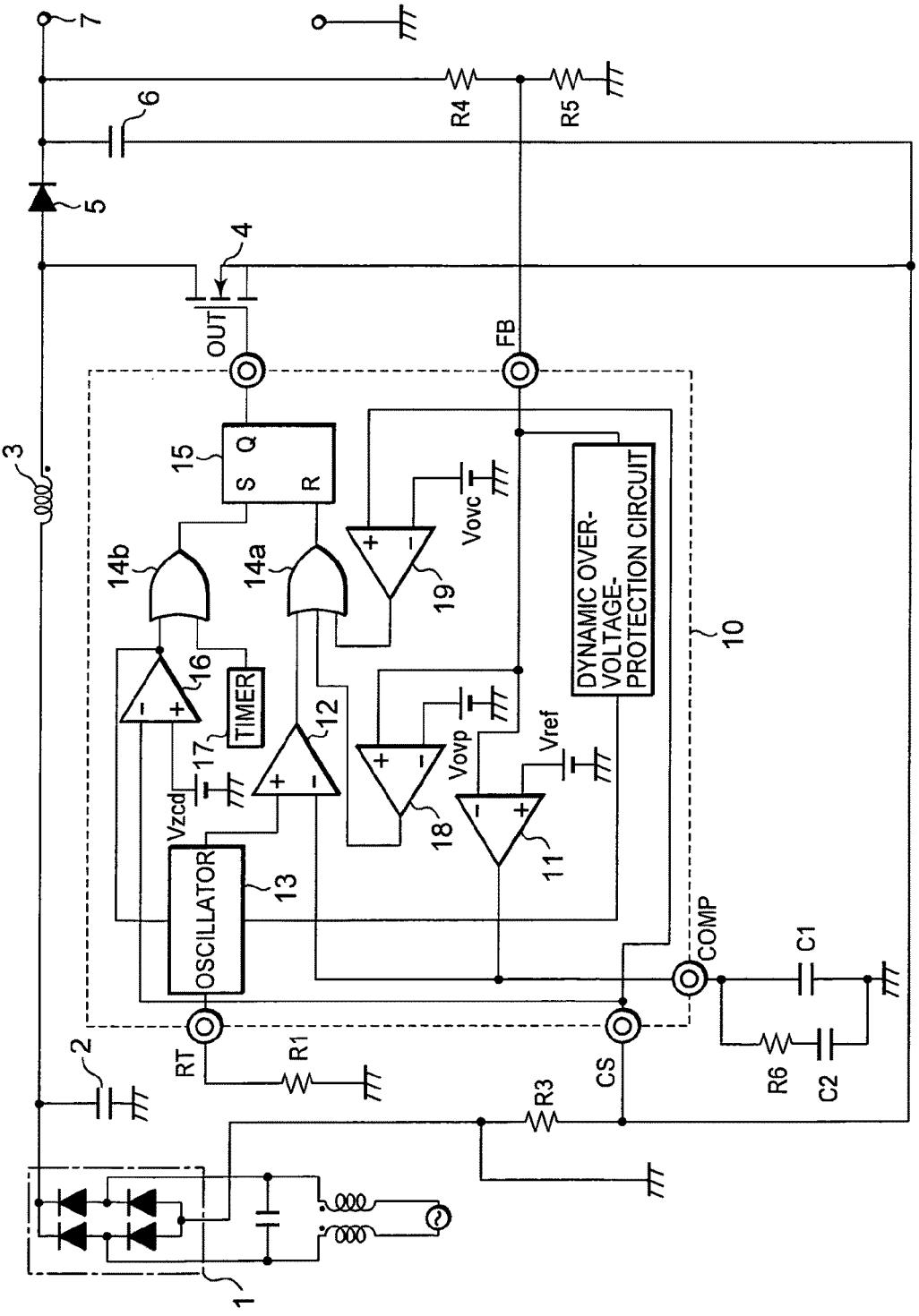
FIG. 5 is a block circuit diagram showing another switching power supply circuit according to the embodiments.

FIG. 5 is a block circuit diagram showing another switching power supply circuit according to embodiments of the invention.

The switching power supply circuit shown in FIG. 5 is different from the switching power supply circuit shown in FIG. 1 in the detection method for detecting the zero-cross point of the inductor current. The switching power supply circuit shown in FIG. 1 detects the zero-cross point by detecting the voltage value obtained by converting the current flowing through inductor 8 on the secondary side of transformer T with resistor R2. The switching power supply circuit shown in FIG. 5 detects the zero-cross point by detecting the voltage value obtained by converting the inductor current with current detecting resistor R3 inserted in the inductor current path. The zero-cross detection in FIG. 5 and the zero-cross detection in FIG. 1 are different from the each other only in the position of detecting the zero-current of inductor 3. Generally, any suitable zero-cross detection method may be applied to the power factor improving circuit according to embodiments of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A switching power supply circuit configured to produce a DC voltage output from an input AC power supply, the switching power supply circuit comprising:
    a full-wave rectifier configured to full-wave rectify the input AC power supply;
    a boost circuit configured to generate the DC voltage output with a predetermined voltage value from an output terminal voltage of the rectifier, the boost circuit including
        a boost inductance element having a first end connected to an output terminal of the rectifier,
        a switching device connected between a second end of the inductance element and a reference potential,
        a rectifying device, and
        a capacitor connected to the second end of the inductance element via the rectifying device; and
    a power factor controller configured to control an ON-period of the switching device based on an error signal obtained by amplifying a difference between feedback of the DC voltage output and a reference voltage;
    the power factor controller configured to compare the DC voltage output feedback with a first protection voltage as the reference voltage, for shortening the ON-period of the switching device by an amount of time corresponding to a difference between the DC voltage output feedback and the first protection voltage.

2. The switching power supply circuit according to claim 1, wherein the power factor controller includes:
    a zero-cross detection circuit configured to detect a zero-cross time of an inductor current of the inductance element, for generating a signal that turns the switching device ON;
    an oscillator circuit configured to output an oscillation signal that increases monotonically at a time at which the switching device is turned ON;
    a comparator circuit configured to generate a signal that turns the switching device OFF if a value of the oscillation signal reaches a value of the error signal; and
    a dynamic over-voltage-protection circuit configured to monitor the DC voltage output feedback and cause the oscillator circuit to increase a gradient at which the oscillation signal increases monotonically, the increase corresponding to the difference between the first protection voltage and the DC voltage output feedback.

3. The switching power supply circuit according to claim 2, wherein the power factor controller further includes a static over-voltage-protection circuit configured to use a second protection voltage higher than the first protection voltage as the reference voltage.

4. The switching power supply circuit according to claim 2, wherein:
    the oscillator circuit includes an integration circuit configured to charge a capacitor with a constant current and to use a charging voltage of the capacitor for the oscillation signal; and
    the dynamic over-voltage-protection circuit is configured to generate an additional charging current having a magnitude corresponding to the difference between the DC voltage output feedback and the first protection voltage, for charging the capacitor.

5. The switching power supply circuit according to claim 4, wherein the power factor controller further includes a static over-voltage-protection circuit configured to use a second protection voltage higher than the first protection voltage for the reference voltage.

6. A power supply circuit to generate a DC voltage output, comprising:
    a power factor controller configured to control an ON-period of a switching device of the power supply circuit, based on a difference between the DC voltage output and a reference voltage;
    wherein, to control the ON-period, the power factor controller is configured to compare a feedback of the DC voltage output with a first protection voltage as the reference voltage, and to shorten the ON-period of the switching device by an amount of time corresponding to a difference between the DC voltage output feedback and the first protection voltage.

7. The power supply circuit according to claim 6, wherein the power factor controller further includes a static over-voltage-protection circuit configured to use a second protection voltage higher than the first protection voltage as the reference voltage.

8. A method comprising:
    comparing a DC voltage output of a power supply circuit with a reference voltage; and
    controlling an ON-period of a switching device of the power supply circuit, based on a difference between the DC voltage output and a reference voltage.

9. The method of claim 8, the controlling comprising shortening the ON-period of the switching device by an amount of time corresponding to the difference.

* * * * *